(12) United States Patent
Huang et al.

(10) Patent No.: US 11,570,616 B2
(45) Date of Patent: Jan. 31, 2023

(54) PROVIDE EPS SECURITY CAPABILITY AND RECEIVE EPS SECURITY ALGORITHM INFORMATION IN 5GS

(71) Applicant: MEDIATEK INC., Hsinchu (TW)

(72) Inventors: Yu-Cheng Huang, Hsinchu (TW); Chi-Chen Lee, Hsinchu (TW); Hao-Hsiang Chung, Hsinchu (TW); Yung-Chun Yang, Hsinchu (TW); Chien-Chun Huang-Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/633,326

(22) PCT Filed: Aug. 7, 2020

(86) PCT No.: PCT/CN2020/107839
§ 371 (c)(1),
(2) Date: Feb. 7, 2022

(87) PCT Pub. No.: WO2021/023303
PCT Pub. Date: Feb. 11, 2021

(65) Prior Publication Data
US 2022/0272526 A1 Aug. 25, 2022

Related U.S. Application Data

(60) Provisional application No. 62/884,207, filed on Aug. 8, 2019.

(51) Int. Cl.
*H04W 12/03* (2021.01)
*H04W 76/10* (2018.01)
*H04W 60/04* (2009.01)

(52) U.S. Cl.
CPC .......... *H04W 12/03* (2021.01); *H04W 60/04* (2013.01); *H04W 76/10* (2018.02)

(58) Field of Classification Search
CPC ...... H04W 12/03; H04W 76/10; H04W 60/04
(Continued)

(56) References Cited

U.S. PATENT DOCUMENTS

2014/0026180 A1   1/2014   Baglin et al.
2018/0310359 A1*  10/2018  Takahashi ............ H04W 76/10
(Continued)

FOREIGN PATENT DOCUMENTS

CN       108464055 A     8/2018
WO       2018/203713 A1  11/2018

OTHER PUBLICATIONS

3GPP TS 24.501 V16.1.0 (Jun. 2019) (Year: 2019).*
(Continued)

*Primary Examiner* — William Nealon
(74) *Attorney, Agent, or Firm* — McClure, Qualey & Rodack, LLP

(57) ABSTRACT

Methods and apparatus are provided for providing UE EPS capability information and receiving non-access stratum (NAS) security algorithm information for an interworking procedure in the 5GS network. In one novel aspect, the UE provides the UE EPS capability information in cleartext before the security mode procedure, and the NAS security algorithm information is included in a security mode command message during the security mode procedure. In one embodiment, the UE EPS capability information is an S1 mode indicator or the 5GMM capability information including the Si mode indicator. In another novel aspect, the network provides the NAS security algorithm information before interworking procedure from 5GS to LTE. In one embodiment, the network provides the NAS security algorithm information in the Registration Accept message. In
(Continued)

another embodiment, the network provides the NAS security algorithm information in handover procedure from the 5GS to LTE.

20 Claims, 10 Drawing Sheets

(58) Field of Classification Search
USPC .......................................................... 455/411
See application file for complete search history.

(56) References Cited

U.S. PATENT DOCUMENTS

2018/0359642 A1    12/2018  Torvinen et al.
2019/0028878 A1*   1/2019   Kawasaki ............. H04W 76/10

OTHER PUBLICATIONS

International Search Report and Written Opinion dated Nov. 12, 2020, issued in application No. PCT/CN2020/107839.
"3rd Generation Partnership Project; Technical Specification Group Services and System Aspects; Security architecture and procedures for 5G system (Release 15);" 3GPP TS 33.501 V0.8.0 (Mar. 2018); Mar. 2018; pp. 1-130.

* cited by examiner

PROVIDE EPS SECURITY CAPABILITY AND RECEIVE EPS SECURITY ALGORITHM INFORMATION IN 5GS

CROSS REFERENCE TO RELATED APPLICATIONS

This application claims priority under 35 U.S.C. § 119 from U.S. Provisional Application No. 62/884,207, entitled "Modem Improvement to Get EPS Security Capability on NR," filed on Aug. 8, 2019, the subject matter of which is incorporated herein by reference.

TECHNICAL FIELD

The disclosed embodiments relate generally to wireless communication, and, more particularly, to provide evolved packet system (EPS) security capability and receive EPS security algorithm information in 5GS/new radio (NR) network.

BACKGROUND

The wireless cellular communications network has grown exponentially over the years. The fifth-generation system (5GS) or the new radio (NR) network is developed to meet the increasing demand for wireless services. The 5GS provides higher speed data services. The roll out of the 5GS in a wireless network will likely be a mix of the 5GS and existing the 4G LTE system. The mobile devices/user equipment (UE) can connect with a 5GS initially and handover to the 4G LTE system and vice versa, which is referred to as an interworking procedure. During a security mode procedure, the UE receives a Security Mode Command message from the 5GS, and then sends a Security Mode Complete message to the 5GS. Under the current 5GS implementation, the 5GS network should select a NAS security algorithm based on EPS capability reported by the UE and provide the NAS security algorithm information in the Security Mode Command message for the UE to perform the interworking procedure. However, based on the current design, the EPS capability of the UE is reported via the Security Mode Complete message after receiving the Security Mode Command message. Therefore, it is not possible for the 5GS network to provide the NAS security algorithm information in the Security Mode Command message for UE. When the UE is triggered to handover/fallback to the 4G LTE, the interworking procedure may fail because the UE does not have the NAS security algorithm information.

A solution is sought for the UE to get the EPS security capability on a 5G new radio (NR)/5GS network.

SUMMARY

Methods and apparatus are provided for providing EPS capability and receive NAS security algorithm information in the 5GS network. In one novel aspect, the UE provides 5GMM capability information before the security mode procedure. In one embodiment, the UE establishes a connection with a 5GS in a wireless network at supports at least the 5GS and an EPS. The UE reports UE EPS capability information in cleartext included in a Registration initial message before a security mode procedure. Subsequently, the UE receives NAS security algorithm information for an interworking procedure from the wireless network in the security mode procedure. In one embodiment, the received NAS security algorithm information is included in a security mode command message. In another embodiment, the UE EPS capability information indicates whether the UE supports an S1 mode interface. In yet another embodiment, the UE EPS capability information includes an S1 mode indicator. In one embodiment, the UE sends a Security Mode Complete message, including 5G mobility management (5GMM) capability information in the security mode procedure to the wireless network. In one embodiment, the 5GMM capability information does not include the S1 mode indicator. In another embodiment, the UE EPS capability information in cleartext is 5GMM capability information, including the S1 mode indicator. In one embodiment, the UE sends a Security Mode Complete message, not including 5GMM capability information in the security mode procedure to the wireless network. In another embodiment, the UE performs the interworking procedure from the 5GS to the EPS based on the received NAS security algorithm information.

In another novel aspect, the network provides Selected NAS security algorithm information before interworking procedure from 5GS to LTE. In one embodiment, the network provides the Selected NAS security algorithm information in the Registration Accept message. In another embodiment, the network provides the Selected NAS security algorithm information in the handover procedure from the 5GS to LTE. In one embodiment, the UE establishes a connection with a 5GS in a in a wireless network, wherein the wireless network supports at least the 5GS and an LTE system. The UE receives Selected NAS security algorithm information from the 5GS before an interworking procedure from the 5GS to the LTE. The UE selects a NAS security algorithm for the LTE system and performs the interworking procedure based on the NAS security algorithm. In one embodiment, the UE provides S1 mode supported capability information in NAS message container of a Registration Request in secured mode prior to the Registration Accept message. In another embodiment, the NAS security algorithms are added to a NAS transparent container. In one embodiment, the 5GS bases station establishes a connection with a UE in a wireless network, wherein the wireless network supports at least the 5GS and an EPS. The base station receives UE EPS capability information in cleartext included in a Registration initial message before a security mode procedure. The base station selects a NAS security algorithm based on the received UE EPS capability information and sends the selected NAS security algorithm information to the UE by the 5GS for an interworking procedure of the UE from the 5GS to the EPS.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
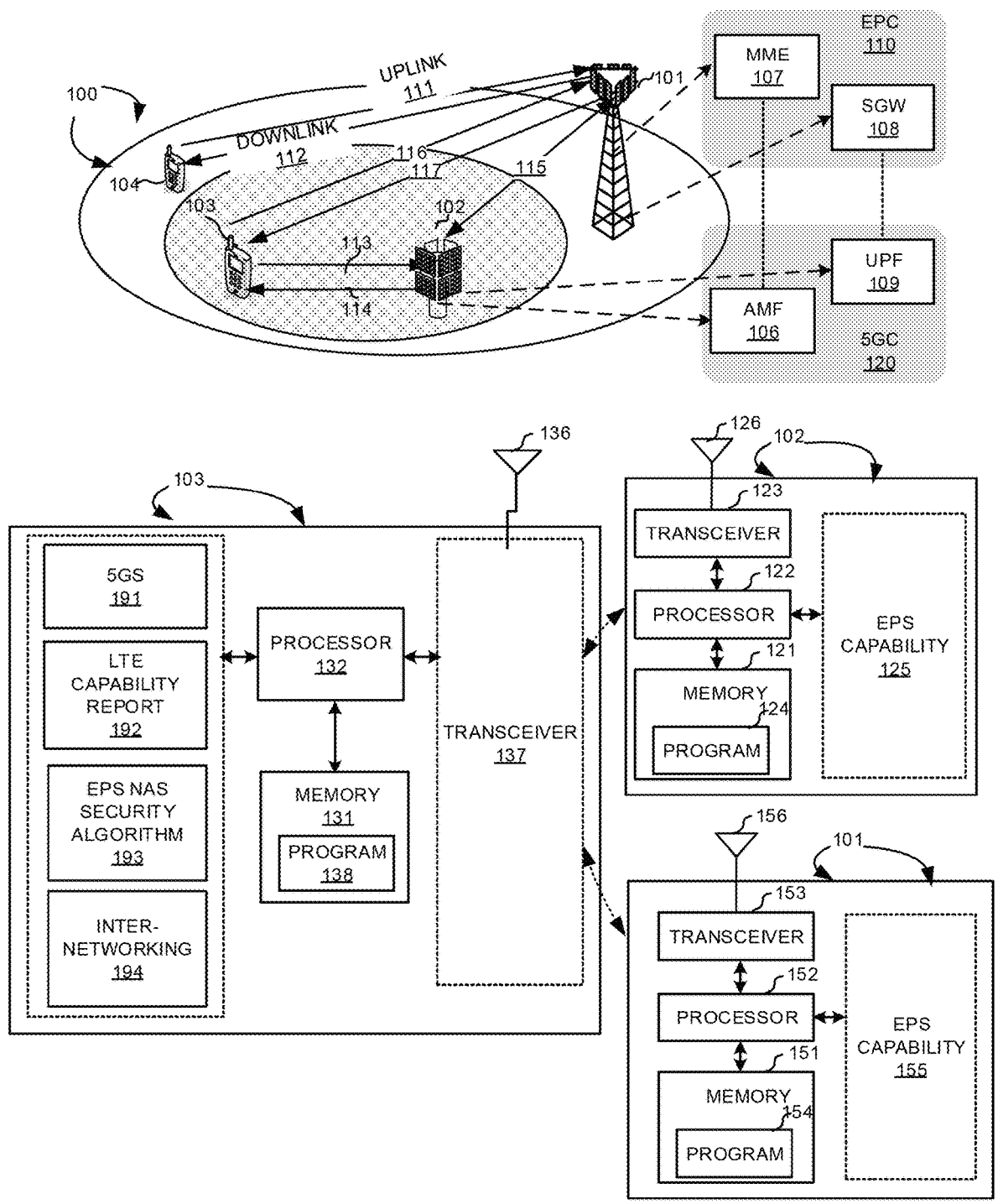
FIG. 1 illustrates an exemplary wireless network for a user equipment (UE) to get EPS security capability on NR in accordance with one novel aspect.

FIG. 1 illustrates an exemplary wireless network for a user equipment (UE) to get EPS security capability on NR in accordance with one novel aspect. Wireless network 100 comprises exemplary 5G system (5GS) and 4G LTE system. 5GS has an exemplary base station gNB 102 and an exemplary 5G core (5GC) 120. 5GC 120 includes an access mobility management (AMF) 106 for control and a user plane function (UPF) 109. 4G/LTE network includes an exemplary base station eNB 101 and an exemplary evolved packet core (EPC) 110. 4G LTE includes an exemplary mobility management entity (MME) 107 for control and a service gate way (SGW) 108. Mobile stations/UEs 103 and 104 connect with the wireless network 100. UE 104 is served by eNB 101 with an uplink 111 and downlink 112. UE 103 is served by gNB 102. When UE 103 is configured with dual connectivity, UE 103 is served by eNB 101 with uplink 116 and downlink 117. At the same time, UE 103 is also served by gNB 102 with uplink 113 and downlink 114. The N26 interface is used between AMF 106 and MME 107 to enable interworking between EPC 110 and 5GC 120. In the wireless network that includes the 5GS and 4G/LTE, when the AMF supports N25 interface and a S1 mode supported indicator is received from the UE, a Selected EPS NAS security algorithm information IE is sent to the UE by the network. The S1 mode is a part of 5GMM capability.

The 5GS supports protection of initial NAS messages, which is different from the 4G LTE system. The protection of initial NAS messages applies to the Registration Request and the Service Request message. In 5GS, the Registration Request message contains cleartext IEs and non-cleartext IEs. When UE 103 does not have a valid 5G NAS security context, the UE first sends a first Registration Request message including cleartext IEs only. After activating the 5G NAS security context resulting from a security mode control procedure, UE 103 sends a Security Mode Complete message. The Security Mode Complete message includes the entire Registration Request message in the NAS message container IE. The NAS message container IE includes both cleartext IEs and the non-cleartext IES if the UE needs to send non-clear IEs. Otherwise, the NAS message container IE in the Security Mode Complete message includes only cleartext IEs. When the initial NAS message is a Registration Request message, the cleartext IEs are: Extended protocol discriminator; security header type; spare half octet; registration request message identity; 5GS registration type; ngKSI; 5GS mobile identity; UE security capability; Additional GUTI; UE status; and EPS NAS message container. The S1 Mode IE, which is a part of the 5GMM capability and indicates whether the UE supports 4G/LTE is not included in the current cleartext IEs. For interworking purposes, when UE 103 is to be transferred to the LTE system from the 5GS, EPS/NAS security algorithms are needed. In the current design, the selected NAS security algorithm information will be indicated in the Security Mode Command when the S1_Mode indicator is set to be supported. Since the S1 mode indicator is not included in the initial cleartext NAS message, selected NAS security algorithm information cannot be included in the first Security Mode Command message.

Under current system, after registration on the 5GS/NR, the UE cannot get the selected NAS security algorithm information, a mandatory information before N1 to S1 interworking, in the first Security Mode Command. The causes problems when the interworking occurs before the UE can get the mandatory selected NAS security algorithm information.

In one novel aspect, information of whether the LTE system is supported by the UE is reported to the network in cleartext. Thereby, the network can return the mandatory selected NAS security algorithm information in the first Security Mode Command. In another novel aspect, the selected NAS security algorithm information is received from the network in other messages other than the Security Mode Command. In one embodiment, the network indicates the selected NAS security algorithm information in Registration Accept message. In another embodiment, the network provides the selected NAS security algorithm information in handover from NR to LTE message through the NAS transparent container.

FIG. 1 further illustrates simplified block diagrams for UE 103, gNB 102, and eNB 101. UE 103 has an antenna 136, which transmits and receives radio signals. An RF transceiver module 137, coupled with antenna 136, receives RF signals from antenna 136, converts them to baseband signals and sends them to processor 132. RF transceiver 137 also converts received baseband signals from processor 132, converts them to RF signals, and sends out to antenna 136. Processor 132 processes the received baseband signals and invokes different functional modules to perform features in UE 103. Memory 131 stores program instructions 138 and data to control the operations of UE 103.

UE 103 also includes multiple modules that carry out different tasks in accordance with embodiments of the current invention. 5GS module/circuit 191 establishes a connection with the 5GS. EPS capability report module/circuit 192, in one embodiment, reports UE EPS capability information in cleartext of a Registration initial message before a security mode procedure, wherein the UE EPS capability information indicates whether the UE supports LTE. In another embodiment, EPS capability report module/circuit 192 reports the EPS capability information in secured mode. An EPS/NAS security algorithm module/circuit 193 receives selected non-access stratum (NAS) security algorithm information from the wireless network and selects a NAS security algorithm and performs the security mode procedure based on the selected NAS security algorithm. An interworking module/circuit 194 performs the interworking procedure based on the selected NAS security algorithm.

Also shown in FIG. 1 is an exemplary block diagram for eNB 101. eNB 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in eNB 101. Memory 151 stores program instructions and data 154 to control the operations of eNB 101. eNB 101 also includes multiple function modules that carry out different tasks in accordance with embodiments of the current invention. An EPS capability module/circuit 155 handles communication with UE 103 and performs EPS capability functions.

Also shown in FIG. 1 is an exemplary block diagram for gNB 102. gNB 102 has an antenna 126, which transmits and receives radio signals. An RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in gNB 102. Memory 121 stores program instructions and data 124 to control the operations of gNB 102. gNB 102 also includes multiple function modules that carry out different tasks in accordance with embodiments of the current invention. An EPS capability module/circuit 125 handles communication with UE 103 and performs EPS capability functions.

With the requirement of protection of initial NAS signaling message, the IEs of the Registration Request are categorized into cleartext IEs, which are sent in the first Registration Request if the UE does not have a valid 5G NAS security context, and non-cleartext IEs, which are sent to the network in the Security Mode Complete message in the secured mode. The UE needs information of selected NAS security algorithm information to perform handover from the 5GS/NR network to the LTE. However, the UE cannot get the selected NAS security algorithm information in the first Security Mode Command because the indication of whether the UE supports the 4G LTE is not a cleartext IE in the Registration Request message. To resolve the problem, improvements and modifications are needed.

Figure 2A:
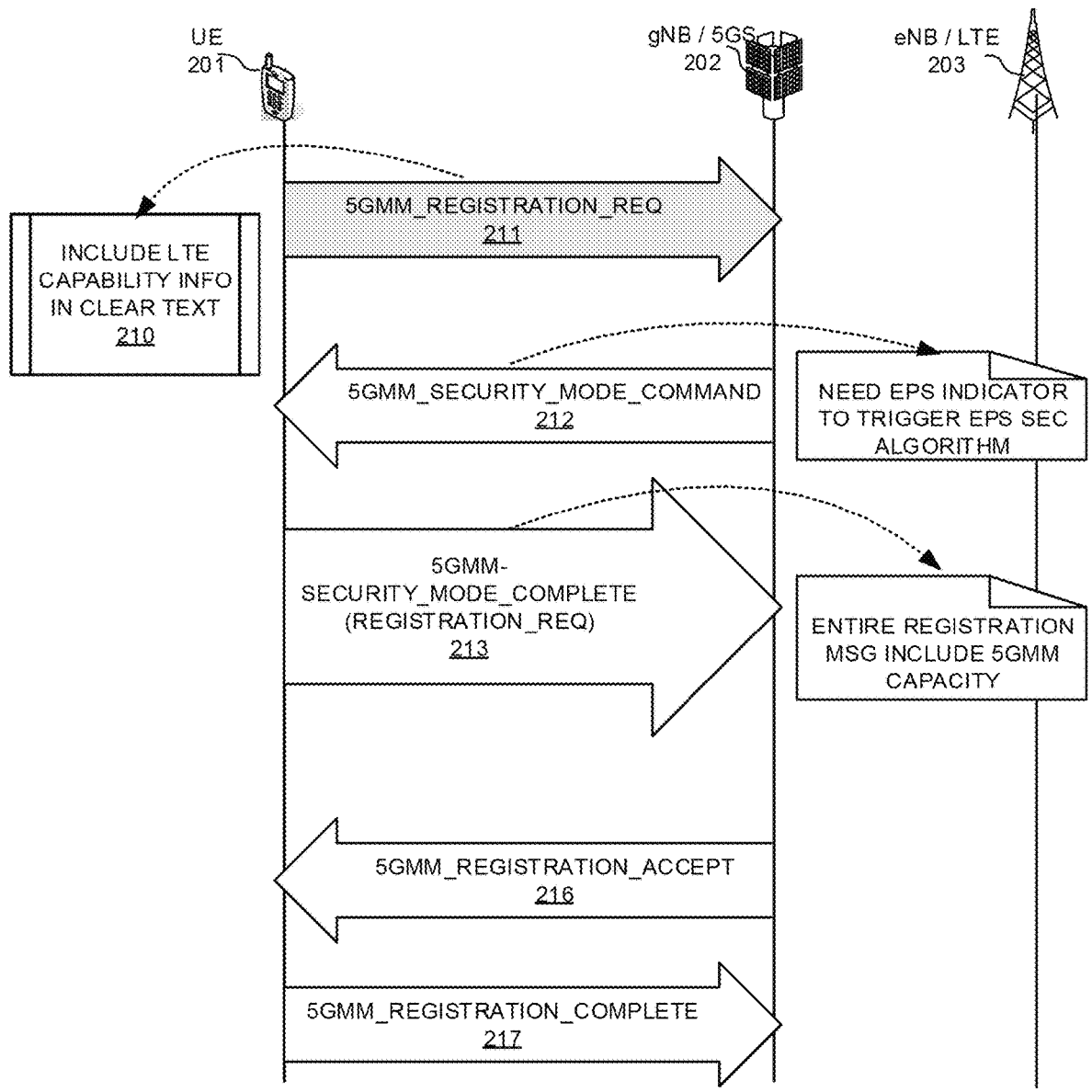
FIG. 2A illustrates an exemplary flow chart that the EPS capability information is included in cleartext in the Registration Request message in accordance with embodiments of the current invention.
Figure 2B:
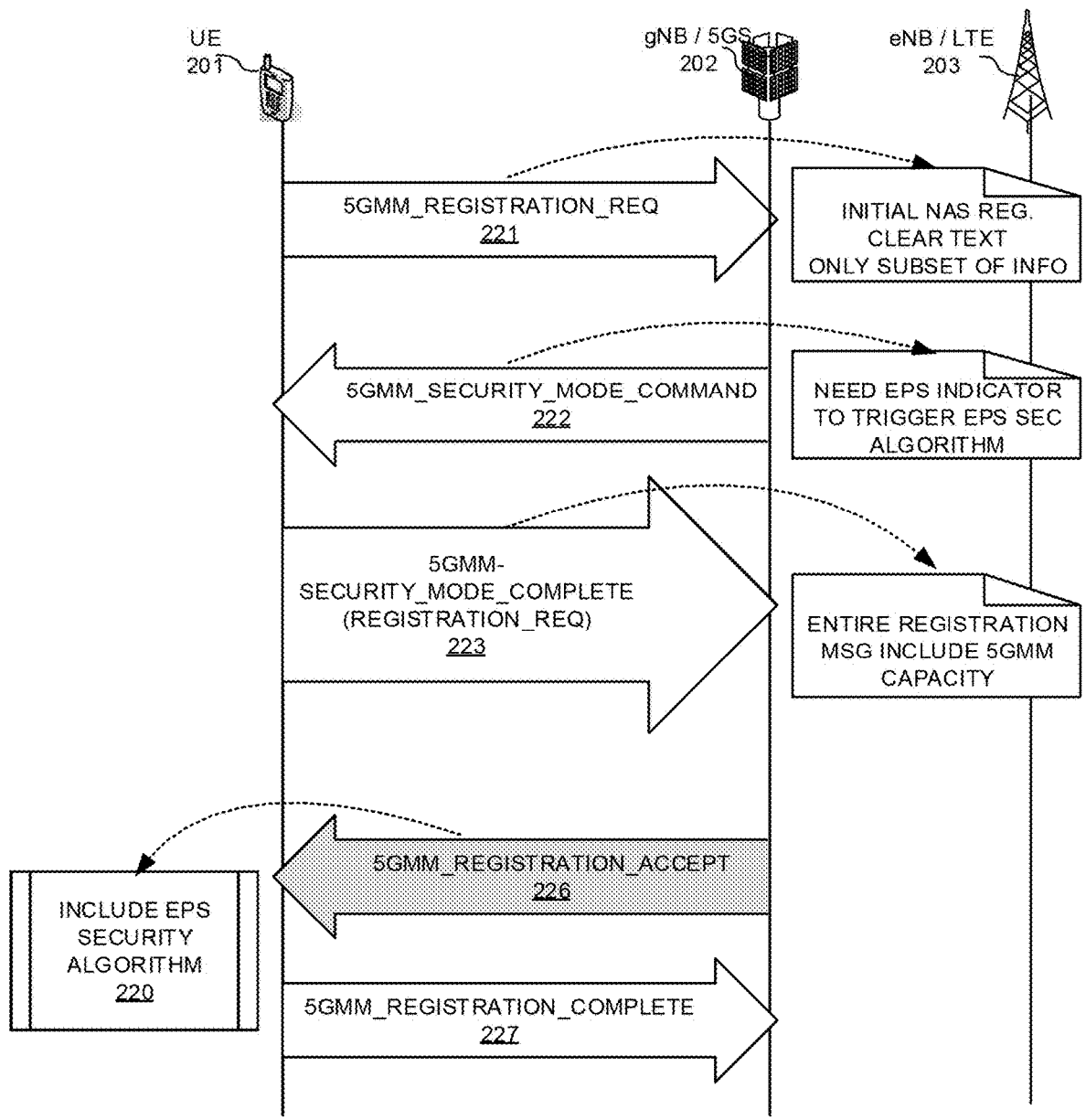
FIG. 2B illustrates an exemplary flow chart that the selected NAS security algorithm information is included in Registration Accept message in accordance with embodiments of the current invention.
Figure 2C:
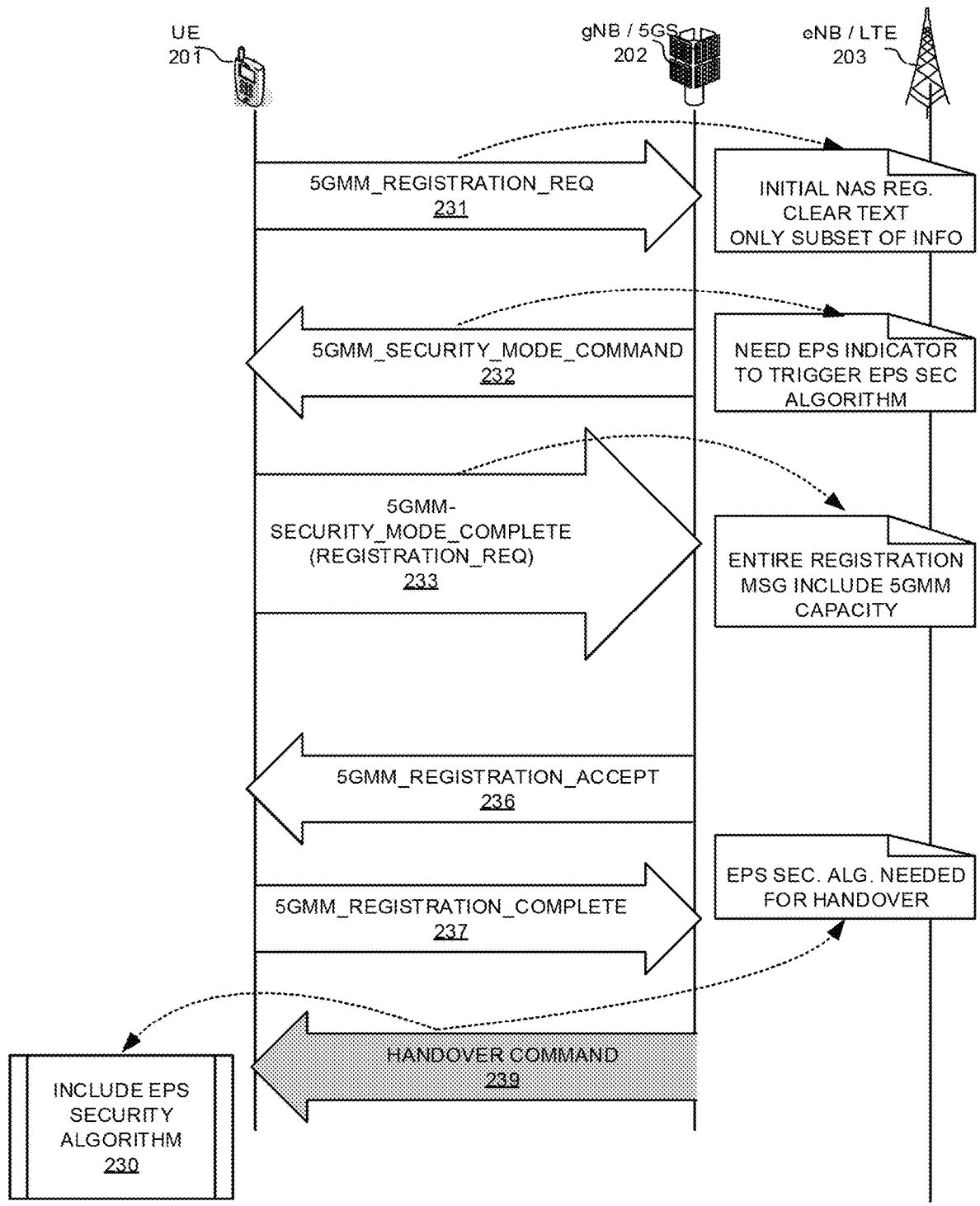
FIG. 2C illustrates an exemplary flow chart that the selected NAS security algorithm information is not included in the Registration Accept message in accordance with embodiments of the current invention.

FIGS. 2A, 2B, and 2C illustrate exemplary flow charts for different embodiments to enable the UE to get the selected NAS security algorithm information for interworking in accordance with embodiments of the current invention. A UE 201 is in a wireless network with at least a 5GS with gNB 202 and an LTE with eNB 203. At step 211, the UE sends the initial NAS message of Registration Request to gNB 202. Since the UE does not have a valid 5G NAS surety context, the first Registration Request 211 includes only cleartext IEs of the Registration Request. The Security Mode Command in response to the Registration Request requires information of the LTE is supported to send the selected NAS security algorithm information.

FIG. 2A illustrates an exemplary flow chart that the EPS capability information is included in cleartext in the Registration Request message in accordance with embodiments of the current invention. The EPS capability information can be the S1 mode indicator, or the 5GMM capability information, or the EPS capability information, or other forms of information that in the cleartext format reports the UE LTE capability. At step 212, the 5GS network 202 sends Security Mode Command message to UE 201. If the S1 mode is supported the Security Mode Command includes selected NAS security algorithm information. The UE enters the secure mode procedure. At step 213, UE 201 sends Security Mode Complete message, which includes the second Registration Request, which includes the non-cleartext IEs. In one embodiment, a default SEL EPS NAS ALGO is configured for the 5GS. If the UE does not support this capacity, the Security Mode Complete message includes an indicator that indicates the SEL EPS NAS ALGO is not supported by the UE. In embodiment 210, by including the EPS capability information in the cleartext Registration Request message, the network can send the selected NAS security algorithm information in the first Security Mode Command message as in step 212. This embodiment reduces unnecessary additional Security Mode Command message and enables the UE to get the mandatory information for interworking. At step 216, gNB 202 sends 5GMM Registration Accept message. At step 217, UE 201 sends 5GMM Registration Complete message.

In another novel aspect, when the EPS capability information is not included in the cleartext first Registration Request message, the network provides selected NAS security algorithm information before interworking procedure from the NR/5GS to the 4G/LTE.

FIG. 2B illustrates an exemplary flow chart that the selected NAS security algorithm information is included in Registration Accept message in accordance with embodiments of the current invention. In this embodiment, the EPS capability information needs not to be in cleartext. The network will send the selected NAS security algorithm information in a different message and enables the UE to get mandatory information for interworking sooner and without the needs for additional Security Mode Command. At step 221, the UE sends the initial NAS message of Registration Request to gNB 202. Since the UE does not have a valid 5G NAS surety context, the first Registration Request 221 includes only cleartext IEs of the Registration Request. The EPS support information is not included in the cleartext IEs. At step 222, the 5GS network 202 sends Security Mode Command message to UE 201. The selected NAS security algorithm information is not included in this message. The At step 223, UE 201 sends Security Mode Complete message, which includes the second Registration Request, which includes the non-cleartext IEs. The UE EPS capability information, such as the S1 mode indicator or EPS capability is included. In one embodiment 220, at step 226, gNB 202 sends 5GMM Registration Accept message, which includes the ESP security algorithm. At step 227, UE 201 sends 5GMM Registration Complete message to gNB 202.

FIG. 2C illustrates an exemplary flow chart that the selected NAS security algorithm information is not included in the Registration Accept message in accordance with embodiments of the current invention. At step 231, the UE sends the initial NAS message of Registration Request to gNB 202. Since the UE does not have a valid 5G NAS surety context, the first Registration Request 231 includes only cleartext IEs of the Registration Request. The EPS support information is not included in the cleartext IEs. At step 232, the 5GS network 202 sends Security Mode Command message to UE 201. The selected NAS security algorithm information is not included in this message. The At step 233, UE 201 sends Security Mode Complete message, which includes the second Registration Request, which includes the non-cleartext IEs. The UE EPS capability information, such as the S1 mode indicator or EPS capability is included. At step 236, gNB 202 sends 5GMM Registration Accept message, which does not include the ESP security algorithm. At step 237, UE 201 sends 5GMM Registration Complete message to gNB 202. The EPS security algorithm needed by interworking is included in the security procedure. In one embodiment 230, the selected NAS security algorithm information is included in handover command 239. The mandatory information selected NAS security algorithm information is sent to the UE in the handover procedure. In one embodiment, the mandatory information selected NAS security algorithm information is included in the handover command at step 231. Embodiment 230 enables the UE to get mandatory information of the selected NAS security algorithm information in a different message and for interworking sooner and without the need for additional Security Mode Command.

In one novel aspect, the UE provides EPS capability information before the security mode procedure. With this approach, the UE gets the mandatory selected NAS security algorithm information in the subsequent Security Mode Command. There are different embodiments with different modifications for the NAS procedure.

Figure 3A:
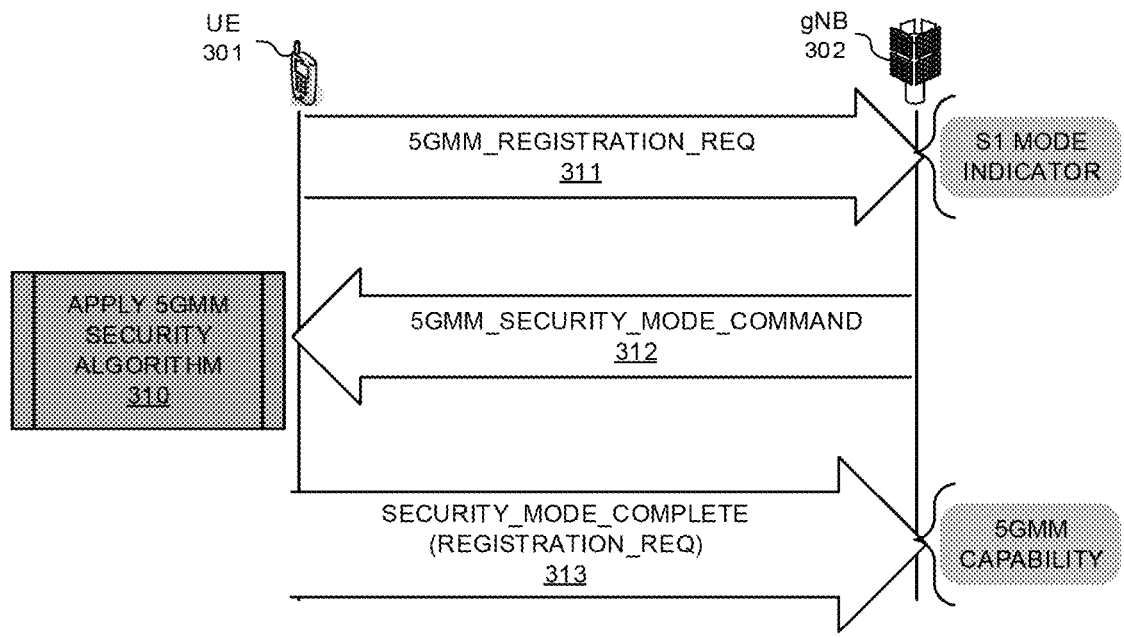
FIG. 3A illustrates an exemplary flow chart for the UE to include S1 mode indicator in cleartext before the security mode procedure in accordance with embodiments of the current invention.

FIG. 3A illustrates an exemplary flow chart for the UE to include S1 mode indicator in cleartext before the security mode procedure in accordance with embodiments of the current invention. The wireless network includes at least the 5GS, with the gNB 302 and LTE. UE 301, at step 311, sends the first Registration Request message to gNB 302. The first Registration Request message includes EPS capability information in cleartext. In one embodiment, the EPS capability information included at step 311 is the S1 mode indicator that indicates whether the UE supports S1 mode interface. In another embodiment, the EPS capability information indicates whether the UE supports LTE and other EPS capability related information. At step 312, gNB 302 sends Security Mode Command. If the S1 mode indicator at step 311 indicates the LTE is supported, the Security Mode Command includes information for the selected NAS security algorithm information. At step 310, the UE selects the NAS security algorithm for the 4G LTE based on the 5GMM security algorithm information from the Security Mode Command. At step 313, UE 301 sends Security Mode Complete message, which includes the second Registration Request with non-cleartext IEs. The non-cleartext IEs in step 313 includes the 5GMM capability.

Figure 3B:
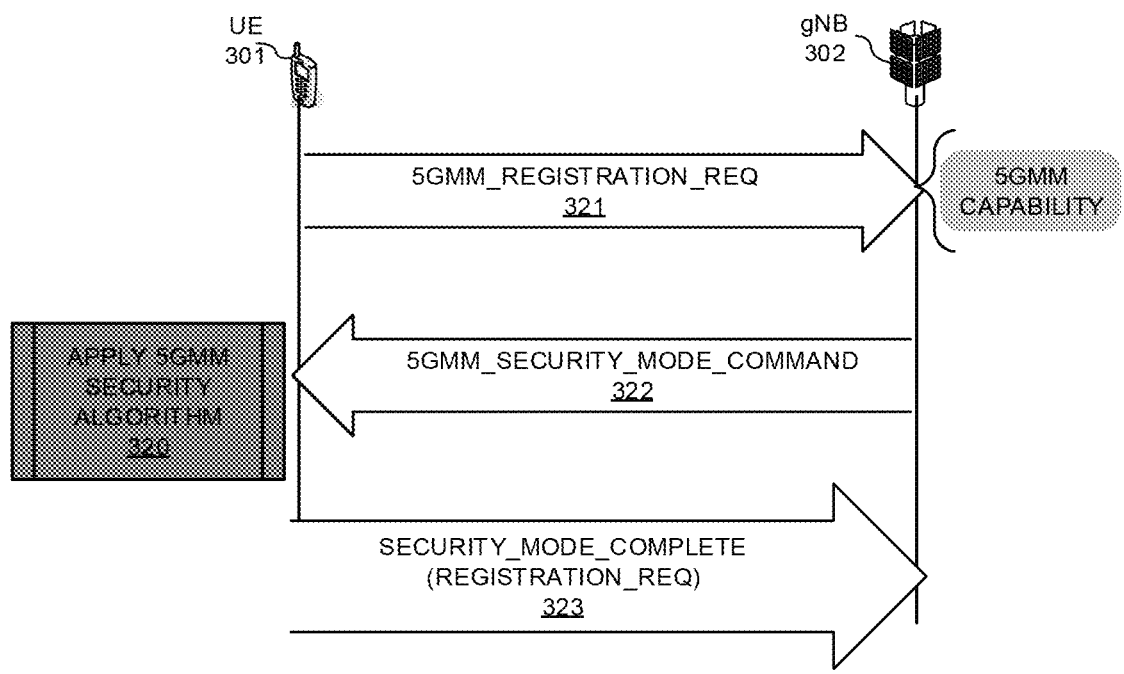
FIG. 3B illustrates an exemplary flow chart for the UE to include 5GMM information in cleartext before the security mode procedure in accordance with embodiments of the current invention.

FIG. 3B illustrates an exemplary flow chart for the UE to include 5GMM information in cleartext before the security mode procedure in accordance with embodiments of the current invention. The wireless network includes at least the 5GS, with the gNB 302 and LTE. UE 301, at step 311, sends the first Registration Request message to gNB 302. The first Registration Request message includes EPS capability information in cleartext. In one embodiment, the EPS capability information included at step 321 is the 5GMM capability that indicates whether the UE supports LTE and other elements related to the 5GMM capability. At step 322, gNB 302 sends Security Mode Command. If the S1 mode indicator in the 5GMM capability at step 321 indicates the LTE is supported, the Security Mode Command includes information for the selected NAS security algorithm information. At step 320, the UE selects the NAS security algorithm for the 4G LTE based on the 5GMM security algorithm information from the Security Mode Command. At step 323, UE 301 sends Security Mode Complete message, which includes the second Registration Request with non-cleartext IEs. The non-cleartext IEs in step 323 does not include the 5GMM capability since it is already sent in cleartext at step 321.

In one novel aspect, the EPS capability information is sent cleartext to the network to trigger the security algorithms information for LTE to be included in the first Security Mode Command message. In another novel aspect, the cleartext IEs in the first Registration Request message remains the same, the network provides the selected NAS security algorithm information for LTE before the handover procedure from the 5GS/NR to the 4G/LTE.

Figure 4:
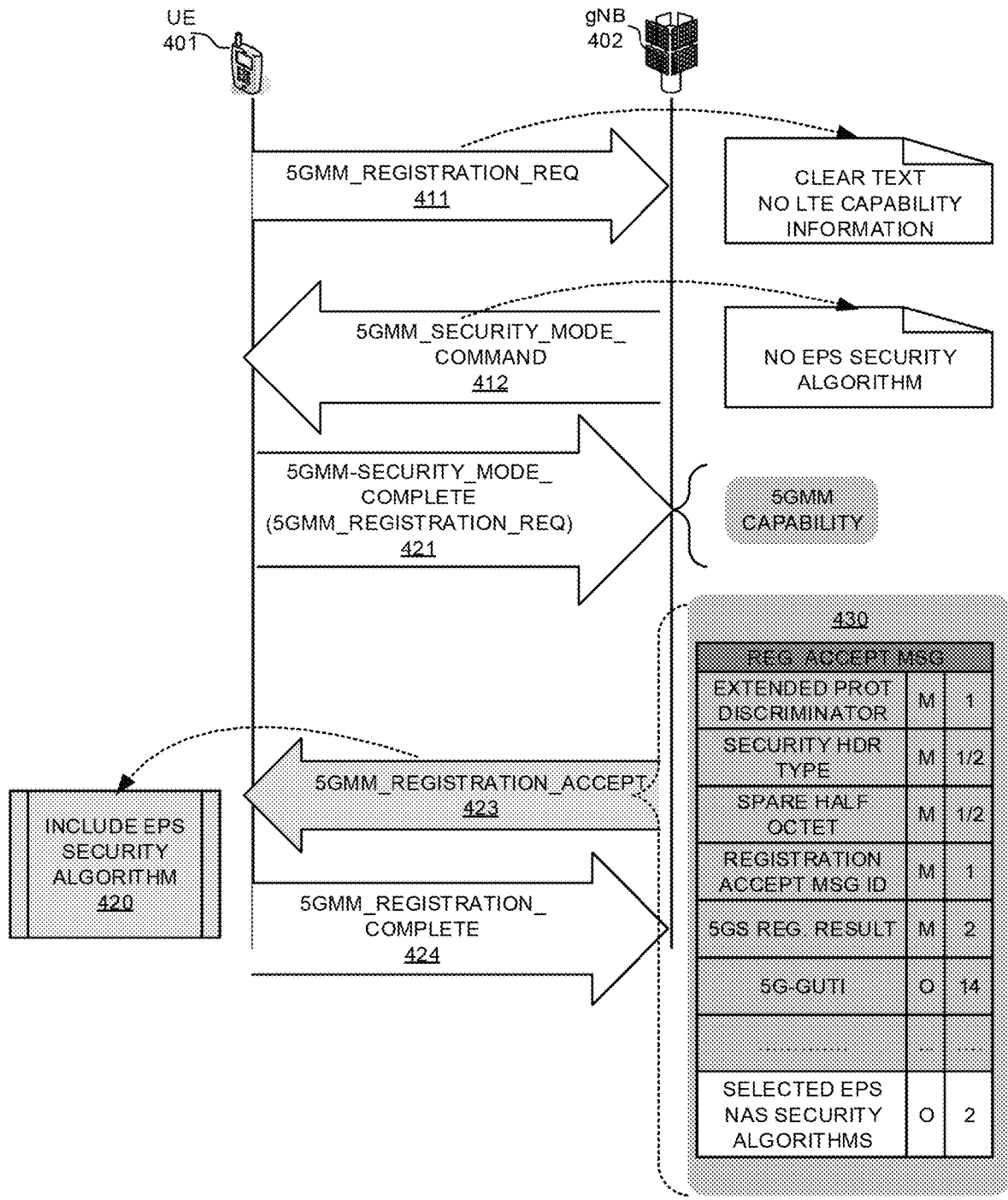
FIG. 4 illustrates exemplary diagrams that illustrates the network provides selected NAS security algorithm information in Registration Accept message in accordance with embodiments of the current invention.

FIG. 4 illustrates exemplary diagrams that illustrates the network provides selected NAS security algorithm information in Registration Accept message in accordance with embodiments of the current invention. A UE 401 is in a wireless network that includes at least a 5GS with gNB 402. At step 411, the UE sends the initial NAS message of Registration Request to gNB 402. Since the UE does not have a valid 5G NAS surety context, the first Registration Request 411 includes only cleartext IEs of the Registration Request. At step 412, The Security Mode Command in response to the Registration Request requires information of the LTE is supported to send the selected NAS security algorithm information. At step 421, UE 401 sends send Security Mode Complete message, embedded the second Registration Request, which includes the non-cleartext IEs such as 5GMM capability. At step 423, the network sends Registration Accept message. Since the 5GMM capability is included in the second Registration Request message at step 421, the selected NAS security algorithm information is included in Registration Accept message at step 423. The modified Registration Accept message 430 includes the mandatory IEs of the message and some optional IEs. The selected NAS security algorithm information is included in Registration Accept message 430. At step 424, the UE sends the Registration Complete message to gNB 402.

Figure 5:
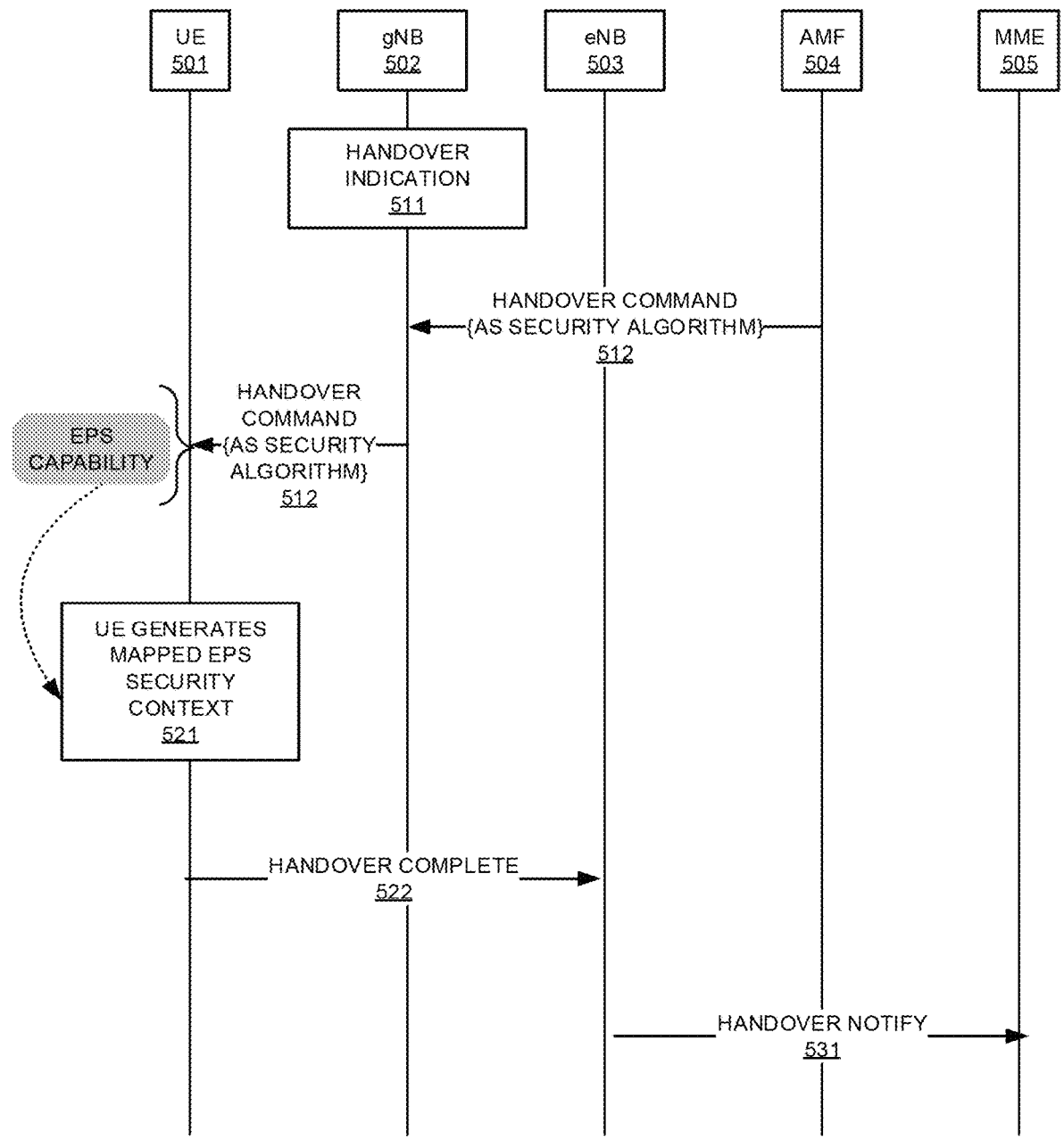
FIG. 5 illustrates exemplary diagrams that illustrates the network provides selected NAS security algorithm information in handover procedures in accordance with embodiments of the current invention.

FIG. 5 illustrates exemplary diagrams illustrating the network providing selected NAS security algorithm information in handover procedures in accordance with embodiments of the current invention. The selected NAS security algorithm information is mandatory information for interworking from the 5GS/NR to the 4G/LTE. In one embodiment, the selected NAS security algorithm information is provided to the UE in the handover procedure. A wireless network includes at least a 5GS/NR system, which includes a gNB 502 and an AMF 504, and a 4G/LTE system, which includes an eNB 503 and an MME 505. UE 501 is connected with the 5GS network. At step 511, gNB 502 generates handover indication. At step 512, AMF 504 sends Handover Command to gNB 502. In one embodiment, the selected NAS security algorithm information is included in the Handover Command to UE 501. Based on the received selected NAS security algorithm information, at step 521, the UE generates mapped EPS security context. In one embodiment, the N1 mode to S1 mode NAS transparent container IE is included in the Handover Command. The N1 to S1 container IE enables the UE to create a mapped EPS security context. In one embodiment, the UE derives EPS NAS keys, such as $K_{NASenc}$ and $K_{NASint}$ using the selected NAS security algorithm information. The UE also derives the initial $K_{eNB}$. At step 522, the UE sends Handover Complete message to eNB 503. At step 531, eNB 503 sends Handover Notify message to MME 505.

Figure 6:
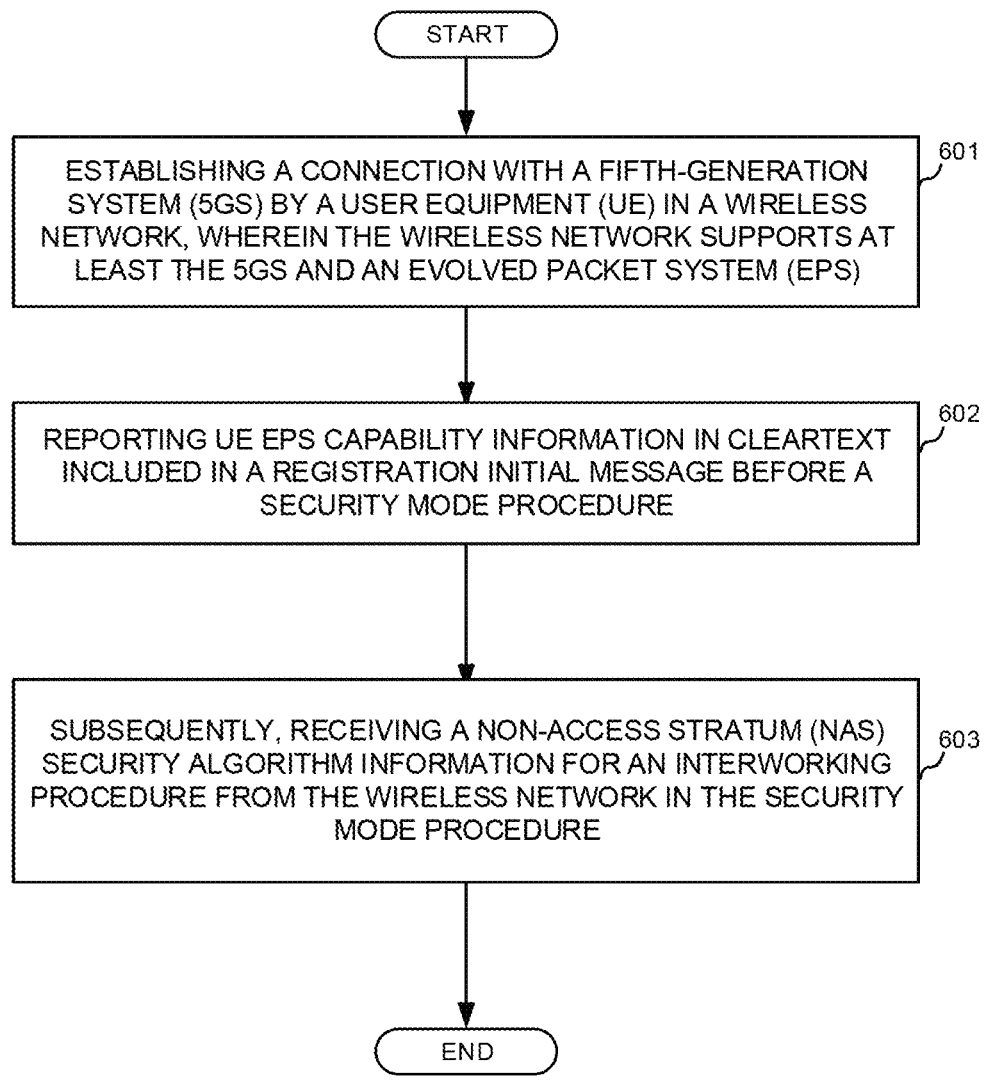
FIG. 6 illustrates an exemplary flow chart illustrates the UE provides 5GMM capability before the security mode procedure in accordance with embodiments of the current invention.
Figure 7:
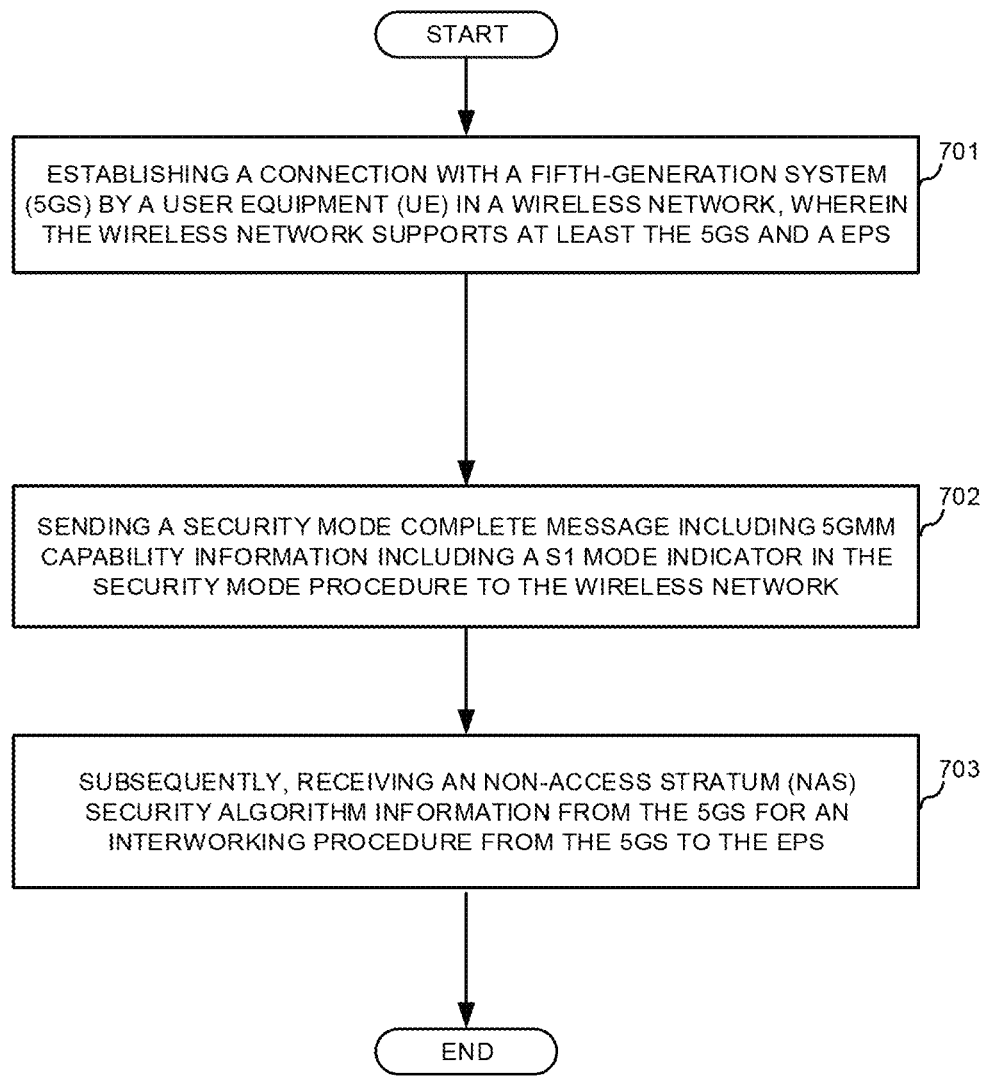
FIG. 7 illustrates an exemplary flow chart of the UE receiving selected NAS security algorithm information from the network before the handover from the 5GS to LTE in accordance with embodiments of the current invention.

FIG. 6 illustrates an exemplary flow chart illustrates the UE provides 5GMM capability before the security mode procedure in accordance with embodiments of the current invention. At step 601, the UE establishes a connection with a 5GS in a wireless network, wherein the wireless network supports at least the 5GS and an EPS. At step 602, the UE reports UE EPS capability information in a Registration initial message before a security mode procedure. At step 603, subsequently, the UE receives a non-access stratum (NAS) security algorithm for an interworking procedure from the wireless network in the security mode procedure FIG. 7 illustrates an exemplary flow chart of the UE receiving selected NAS security algorithm information from the network before the handover from the 5GS to LTE in accordance with embodiments of the current invention. At step 701, the UE establishes a connection with a 5GS in a wireless network, wherein the wireless network supports at least the 5GS and an EPS. At step 702, the UE sends a Security Mode Complete message including 5GMM capability information including a S1 mode indicator in the security mode procedure to the wireless network. At step 703, the UE, subsequently, receives a NAS security algorithm from the 5GS for an interworking procedure from the 5GS to the EPS.

Figure 8:
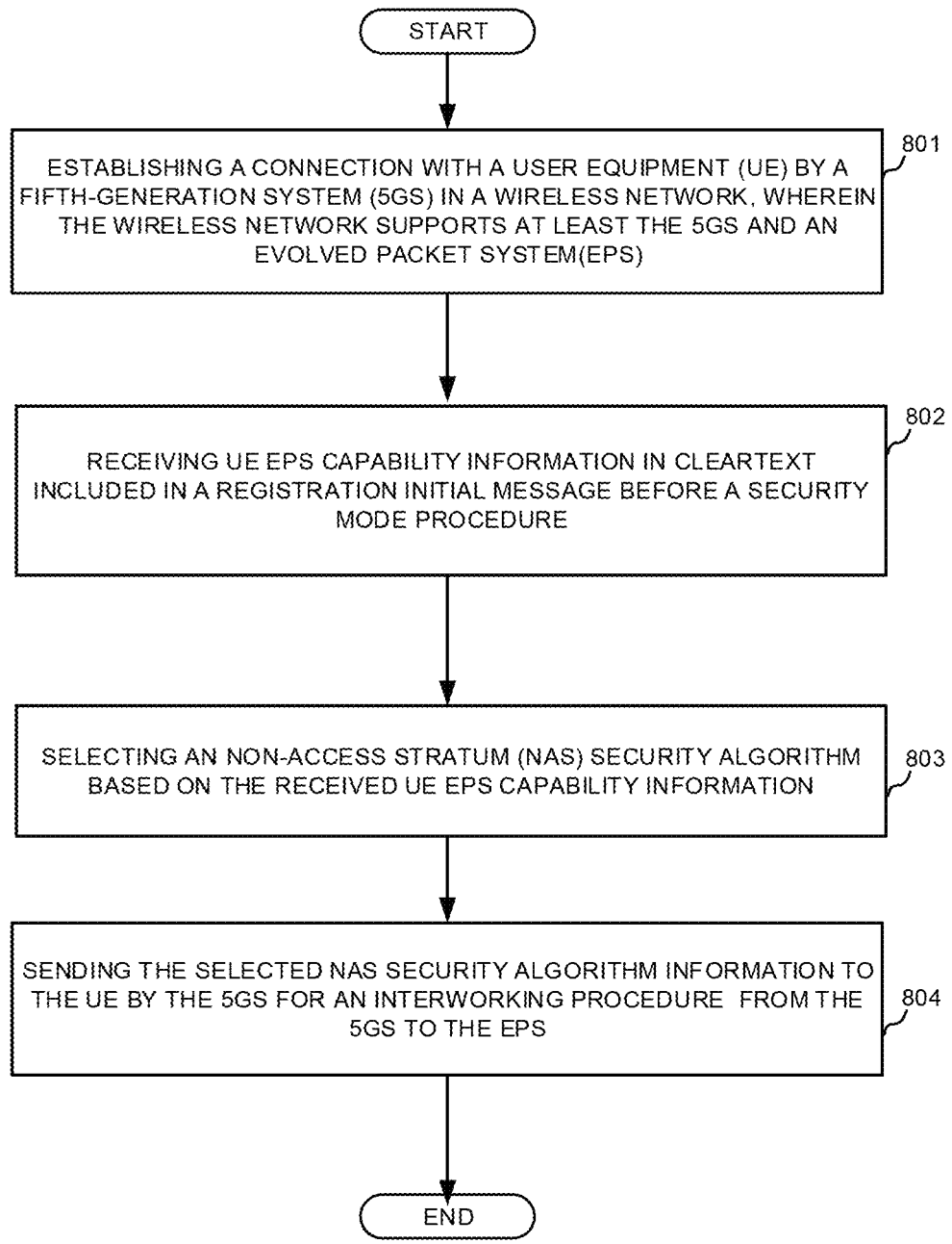
FIG. 8 illustrates an exemplary flow chart of the network sending selected NAS security algorithm information to the UE before the handover from the 5GS to LTE in accordance with embodiments of the current invention.

FIG. 8 illustrates an exemplary flow chart illustrates the network sends selected NAS security algorithm information to the UE before the handover from the 5GS to LTE in accordance with embodiments of the current invention. At step 801, the 5GS base station establishes a connection with a UE in a wireless network, wherein the wireless network supports at least the 5GS and an EPS. At step 802, the 5GS base station receives UE EPS capability information in cleartext included in a Registration initial message before a security mode procedure. At step 803, the 5GS base station selects a non-access stratum (NAS) security algorithm based on the received UE EPS capability information. At step 804, the 5GS base station sends the selected NAS security algorithm information to the UE by the 5GS for an interworking procedure of the UE from the 5GS to the EPS.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method, comprising:
   establishing a connection with a fifth-generation system (5GS) by a user equipment (UE) in a wireless network, wherein the wireless network supports at least the 5GS and an evolved packet system (EPS);
   reporting UE EPS capability information in cleartext included in a Registration initial message before a security mode procedure; and
   subsequently, receiving a non-access stratum (NAS) security algorithm information for an interworking procedure from the wireless network in the security mode procedure.

2. The method of claim 1, wherein the received NAS security algorithm information is included in a security mode command message.

3. The method of claim 1, wherein the UE EPS capability information indicates whether the UE supports an S1 mode interface.

4. The method of claim 3, wherein the UE EPS capability information includes an S1 mode indicator.

5. The method of claim 4, further comprising: sending a Security Mode Complete message including 5G mobility management (5GMM) capability information in the security mode procedure to the wireless network.

6. The method of claim 5, wherein the 5GMM capability information does not include the S1 mode indicator.

7. The method of claim 4, wherein the UE EPS capability information is 5GMM capability information including the S1 mode indicator.

8. The method of claim 7, further comprising: sending a Security Mode Complete message not including 5GMM capability information in the security mode procedure to the wireless network.

9. The method of claim 1, further comprising: performing the interworking procedure from the 5GS to the EPS based on the received NAS security algorithm information.

10. A method, comprising:
    establishing a connection with a user equipment (UE) by a fifth-generation system (5GS) in a wireless network, wherein the wireless network supports at least the 5GS and an evolved packet system (EPS);
    receiving UE EPS capability information in cleartext included in a Registration initial message before a security mode procedure;
    selecting a non-access stratum (NAS) security algorithm based on the received UE EPS capability information; and
    sending the selected NAS security algorithm information to the UE by the 5GS for an interworking procedure from the 5GS to the EPS.

11. The method of claim 10, wherein the received NAS security algorithm information is included in a security mode command message.

12. The method of claim 10, wherein the UE EPS capability information indicates whether the UE supports an S1 mode interface.

13. The method of claim 12, wherein the UE EPS capability information includes an S1 mode indicator.

14. The method of claim 13, further comprising: receiving a Security Mode Complete message including 5G mobility management (5GMM) capability information in the security mode procedure from the UE.

15. The method of claim 14, wherein the 5GMM capability information does not include the S1 mode indicator.

16. The method of claim 13, wherein the UE EPS capability information is 5GMM capability information including the S1 mode indicator.

17. The method of claim 16, further comprising: receiving a Security Mode Complete message not including 5GMM capability information in the security mode procedure from the UE.

18. The method of claim 10, further comprising: performing the interworking procedure from the 5GS to the EPS based on the received NAS security algorithm information.

19. A method, comprising:
    establishing a connection with a fifth-generation system (5GS) by a user equipment (UE) in a wireless network, wherein the wireless network supports at least the 5GS and an evolved packet system (EPS);

sending a Security Mode Complete message including 5GMM capability information including a S1 mode indicator in the security mode procedure to the wireless network; and subsequently, receiving a non-access stratum (NAS) security algorithm information from the 5GS for an interworking procedure from the 5GS to the EPS.

20. The method of claim 19, wherein the NAS security algorithm information is included in a Registration Accept message or a handover command.

* * * * *